United States Patent [19]

Greene

[11] 4,020,784
[45] May 3, 1977

[54] VISUAL INDICATOR FOR A FLUID OPERATED SYSTEM

[75] Inventor: Sanford I. Greene, Hollywood, Fla.

[73] Assignee: Micro Pneumatic Logic, Inc., North Miami Beach, Fla.

[22] Filed: Oct. 24, 1975

[21] Appl. No.: 625,661

[52] U.S. Cl. .................. 116/114 PV; 116/117 C; 137/557

[51] Int. Cl.² ........................................ G01L 19/12

[58] Field of Search ..... 116/117 C, 117 R, 114 PV; 73/228, 252, 419, 388; 137/557, 559; 251/59

[56] References Cited

UNITED STATES PATENTS

| | | | |
|---|---|---|---|
| 1,249,120 | 12/1917 | Knight | 116/117 R X |
| 2,240,492 | 5/1941 | De Juhasz | 73/419 |
| 2,676,488 | 4/1954 | Wilcox | 137/551 X |
| 2,921,157 | 1/1960 | Stein | 116/117 R X |
| 3,354,716 | 11/1967 | Wiebe et al. | 73/228 X |
| 3,525,263 | 8/1970 | Rupert | 73/419 |
| 3,532,069 | 10/1970 | Morgan et al. | 116/114 PV |
| 3,623,448 | 7/1976 | Resh et al. | 116/114 PV |

*Primary Examiner*—Richard C. Queisser
*Assistant Examiner*—Daniel M. Yasich
*Attorney, Agent, or Firm*—Lewis H. Eslinger

[57] ABSTRACT

A visual indicator for a fluid operated system comprising a housing defining a compartment therein and having a viewing portion. First and second fluid channels are provided in the housing and terminate at respective outputs which discharge to the compartment for applying fluid pressures thereto. A vane is rotatably mounted in the compartment and is responsive to applied fluid pressures so as to rotate between first and second positions. The vane has spaced apart output sealing members for substantially sealing the first and second outlets in accordance with the extreme rotary position assumed by the vane to thereby prevent fluid from flowing through a correspondingly sealed fluid channel. Indicia is provided on the surface of the vane so as to be selectively disposed in an indicating position for viewing through the viewing portion of the housing when the vane rotates to a corresponding one of its extreme positions.

8 Claims, 4 Drawing Figures

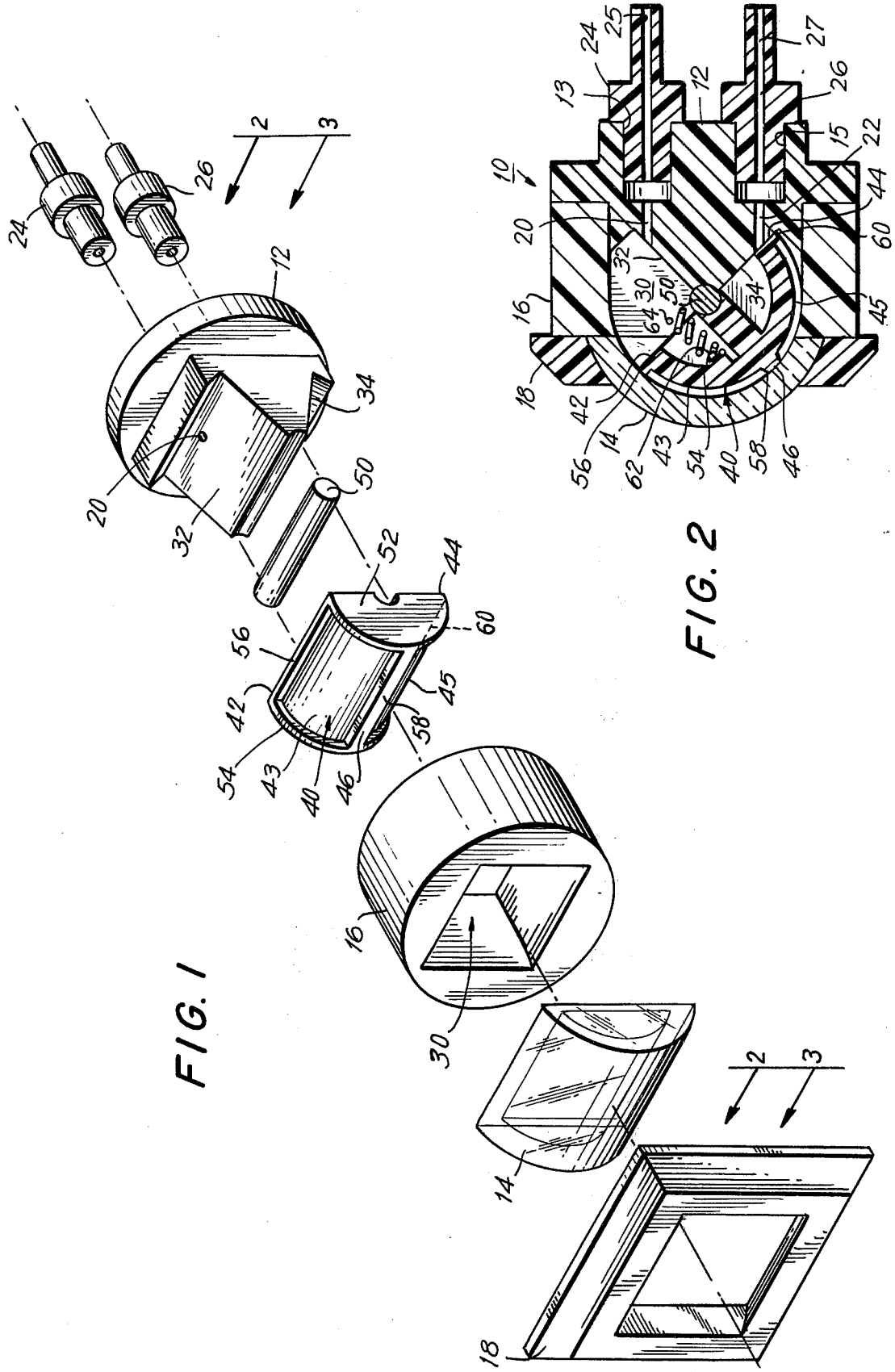

TABLE OF SYMBOLS

VISUAL INDICATOR FOR A FLUID OPERATED SYSTEM

BACKGROUND OF THE INVENTION

This invention relates to a visual indicator for a fluid operated system and, more particularly, to an improved indicator which is responsive to relatively low actuating pressures applied thereto so as to selectively dispose predetermined indicia in an indicating position to thereby furnish an indication of the operating condition of the system.

In various types of fluid operated systems, such as in fluidic logic systems, fluidic control systems, or the like, there is a need to monitor various portions and components of the system so that suitable action can be taken should the necessity for same arise. For example, it is important to be appraised immediately of a system malfunction. Also, in a system wherein interrelated devices are used, and wherein the operation of the system is interdependent upon the respective devices the respective operating conditions of critical devices should be monitored, Such monitoring is advantageous in field testing new or proposed systems and is invaluable during trouble-shooting and maintenance of fluidic systems.

In general, many of the indicating devices which previously have been used to monitor the operating conditions of a fluid operated system have been of the electrical or electromechanical type. These devices often added to the complexity of the fluid operated system and, in many instances, required substantial fluid-to-electrical or fluid-to-mechanical interface components in order to be operable.

Recently, various visual indicating devices have been proposed which are directly responsive to fluid flow or to a differential fluid pressure. Essentially, these devices are switches and are capable of exhibiting a first or a second state depending upon the fluid flow or differential pressure applied thereto. One such device is described in U.S. Pat. No. 3,528,384. This patented device includes a vane disposed within a housing, the vane being bidirectionally rotated depending upon the direction of fluid flow in the housing. Unfortunately, although the vane rotates in response to fluid flow between the fluid conduits in the device, there is no capability of sealing one or the other of the fluid channels as a result of this rotation. Consequently, this device suffers from the disadvantage of requiring fluid consumption during its operation. This consumption tends to limit the application of the indicating device to those systems wherein excessive fluid leakage is of no importance.

Another fluid condition indicating device has been proposed in U.S. Pat. No. 3,541,991. However, this device suffers from the same disadvantage as noted hereinabove in that there is no capability of sealing any of the fluid conduits. Hence, this device is accompanied by excessive fluid consumption. Moreover, this device does not readily provide respective indications of bidirectional fluid flow.

A still further indicator device for a fluid operated system is described in U.S. Pat. No. 3,643,620. This patented device is of a complex construction and requires the visual indicating mechanism to be mechanically separated from the fluid monitoring mechanism.

In addition to the foregoing defects, the prior art devices generally require a substantially high minimum actuating pressure to produce a change in the visual indication of the fluid operating condition. For example, such devices generally are not responsive to a fluid pressure less than about 15 psig.

Therefore, there has been a long-felt need for a fluid condition visual indicator which is of simple construction and which is not accompanied by excessive fluid leakage. Also, such a visual indicator should be responsive to very low actuating pressures, on the order of less than 1 psig.

Also, although it is common for visual indicators to be provided with indicia representing a fluid operating condition, it is believed that no visual indicator currently is available which provides graphic indicia directly representative of the particular fluid operating condition which is being monitored. Although graphic symbols have been used for many years to schematically represent the operation of fluidic components, it is believed that there has been no prior attempt to use these graphic symbols in conjunction with a fluidic monitoring visual indicator.

OBJECTS OF THE INVENTION

Therefore, it is an object of the present invention to provide an improved visual indicator for a fluid operated system which is of relatively simple construction.

Another object of this invention is to provide an improved visual indicator which can be used to monitor the operating condition of a fluidic system and which is accompanied by negligible fluid leakage.

Yet another object of this invention is to provide a visual indicator for use in a fluid operated system and which is responsive to very low pressures.

A still further object of this invention is to provide a visual indicator for a fluid operated system wherein positive dynamic sealing elements, such as O-rings or gaskets, are not used, yet fluid leakage is significantly minimized.

An additional object of this invention is to provide a visual indicator for a fluid operated system wherein the operating conditions of the system are indicated by graphic symbols of the type adopted by the American National Standards Institute Inc. for schematically representing the operation of fluid components.

Another object of this invention is to provide a fluidic system visual indicator which is capable of being automatically reset to provide a quiescent indication in response to normal gravitational forces.

A further object of this invention is to provide a fluidic system visual indicator which is capable of "remembering" an immediately preceding condition so as to "store" therein an immediately preceding visual indication.

Various other objects and advantages of the present invention will become apparent from the ensuing detailed description, and the novel features will be particularly pointed out in the appended claims.

SUMMARY OF THE INVENTION

A visual indicator for a fluid operated system is comprised of a housing defining a compartment therein and having a viewing portion; the housing being provided with a pair of fluid channels for communicating fluid to the compartment from an external source in response to fluid pressures applied thereto; a vane is rotatably mounted in the compartment and is responsive to the selective application of fluid pressures to the fluid channels so as to rotate between first and second extreme positions, the vane having spaced apart sealing members for substantially sealing the respective fluid channels in accordance with the particular extreme position assumed by the vane; and indicia are provided on the surface of the vane so as to be viewed through the viewing portion of the housing when the vane rotates to a corresponding one of its extreme positions.

BRIEF DESCRIPTION OF THE DRAWINGS

The following detailed description, given by way of example, will best be understood in conjunction with the accompanying drawings in which:

FIG. 1 is an exploded perspective view of one embodiment of a visual indicator in accordance with the present invention;

FIG. 2 is a sectional elevational view taken along lines 2—2 in FIG. 1 representing one indication of the visual indicator;

DETAILED DESCRIPTION OF A CERTAIN PREFERRED EMBODIMENT

Figures 3, 4:
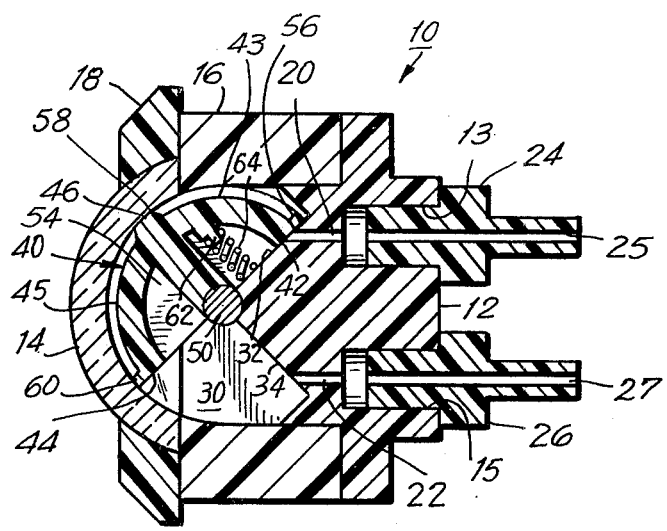
FIG. 3 is a sectional elevation view taken along lines 3—3 in FIG. 1 showing another indication provided by the visual indicator.
FIG. 4 illustrates a table of graphical symbols which can be used with the visual indicator of the present invention.

Referring now to the drawings, wherein like reference numerals are used throughout, there is illustrated a preferred embodiment of the visual indicator in accordance with the present invention which can be used to provide indications of the operating conditions of a fluid operated system. The visual indicator 10 is comprised of a housing formed of an end block member 12, a cylindrical wall 16, and a viewing window 14. As shown, the end block member, cylindrical wall and viewing window define a compartment 30 therein. Although the side wall of the end block member 12 which faces the compartment 30 can be a single, planar wall, it is preferred that this wall is formed of angulated sections 32 and 34, as shown, for a purpose soon to be described. In one embodiment, the end block member 12 is constructed of plastic material and may be molded to the illustrated configuration.

A pair of recesses 13 and 15 are formed in the end block member 12, these recesses being adapted to receive supply pipes 24 and 26, respectively. The supply pipes are formed with fluid conduits 25 and 27 therein and permit pressure hoses, not shown, to be connected thereto. Hence, a differential pressure can be applied across these supply pipes so that fluid tends to flow from one pipe to the other. It may be appreciated that, for the purpose of the present discussion, it will be assumed that a positive pressure differential is present when the pressure applied to the pipe 26 exceeds the pressure applied to the pipe 24, whereby fluid tends to flow through the conduit 27 into the compartment 30 and thence through the conduit 25. Similarly, a negative differential pressure is assumed to be present when the pressure at the pipe 24 exceeds the pressure at the pipe 26.

In one embodiment, the respective pipes 24 and 26 are threaded to engage mating threads provided in the recesses 13 and 15 of the end block member 12. Hence, a fluid tight coupling is formed between the fluid supply pipes 24, 26 and the end block member 12. Of course, if desired, alternative fluid supply couplings may be provided to furnish fluid to the end block member.

As shown, the end block member 12 includes respective fluid channels 20 and 22 therein. The purpose of these channels is to communicate fluid with the compartment 30. Hence, the channels 20 and 22 are seen to terminate at outlets which discharge to the compartment 30. The fluid channels 20 and 22 should be aligned with the conduits 25 and 27, respectively, in the supply pipes 24 and 26. To facilitate this alignment, the supply pipes are provided with respective shoulders which abut the exterior wall of the end block member 12 so as to limit the insertion of the pipes into the respective recesses, thereby forming fluid supply chambers intermediate the fluid conduits 25, 27 and the fluid channels 20, 22, respectively. As is appreciated, these fluid supply chambers obviate the necessity of precise alignment of the respective fluid conduits and channels.

In one embodiment, the end block member 12 is of circular cross-section so that the cylindrical wall 16 is mounted to the end block member in sealing engagement. If desired, the end block member 12 and the cylindrical wall mounted thereto can be integrally formed by conventional molded construction techniques. Of course, other configurations of the end block member and adjacent wall can be used, as desired. As shown more clearly in the exploded perspective illustration, the end portion of the cylindrical wall 16 is provided with a viewing portion adapted to receive the viewing window 14 therein. Preferably, the viewing window is transparent to permit a visual indication therethrough of visible indicia, to be described.

The angulated walls 32 and 34 of the end block member 12 intersect in the compartment 30 to define a suitable support member for a shaft 50. In one embodiment, suitable bearing members may be provided at the intersection of the angulated walls 32 and 34 for rotatably supporting the shaft 50 therein. A vane 40 is rotatably mounted on the shaft 50 for rotation therewith. Alternatively, the shaft may be fixedly mounted on the angulated walls 32 and 34 and the vane 40 may be journalled for rotation about this shaft. As shown in the embodiment depicted in FIG. 1, the vane 40 is comprised of a pair of arcuate members 52 and 54 which are spaced apart from each other by a frame defined by struts 56, 58 and 60. Thus, the arcuate members 52 and 54 define an arcuate, or cylindrical, surface having a center of curvature which is coincident with the axis of rotation of the vane, as defined by the shaft 50. It is appreciated that the struts 56 and 58 and the struts 58 and 60 divide the arcuate surface of the vane into substantially equal sections 43 and 45, respectively. In one embodiment, the arcuate surface of the vane 40 subtends an angle of 180°, whereby the struts 56 and 60 are diammetrically spaced apart. In this example, the struts 56 and 58 define the surface portion 43 which subtends one-half the angle subtended by the total arcuate surface. Hence, the surface portion 43 of the vane subtends an angle of approximately 90°. Similarly, the struts 58 and 60 subtend one-half the angle subtended by the entire arcuate surface such that the surface portion 45 defines an angle of approximately 90°. In accordance with this geometric example, the angulated walls 32 and 34 of the end block member 12 intersect at an angle of approximately 90°.

The strut 56 terminates in or includes a portion having an outlet sealing member 42. This sealing member may be constructed of the same material as the strut 56, for example, plastic or metal, or may be formed of a resiliently flexible material conventionally used for fluid sealing. Similarly, the strut 60 terminates in or includes a portion having a sealing member 44 which is substantially identical to the sealing member 42. It is appreciated that the respective sealing members 42 and 44 are disposed so as to be rotated into alignment and sealing engagement with the respective outlets of the fluid channels 20 and 22.

In a preferred embodiment thereof, the vane 40 includes a weighted member 46. This weighted member may be formed of the strut 58. Alternatively, the arcuate members 52 and 54 may form this weighted member. As a further alternative, the weighted member 46 may comprise a weighted radial spoke which extends from the shaft 50 to the arcuate surface of the vane 40.

As shown, the arcuate surface of the vane 40 contacts the viewing window 14 so as to be securely mounted on the shaft 50, but without requiring additional mounting members which might inherently add frictional restraints to the rotation of the vane. This permits the vane to rotate in response to very low pressures applied to the fluid channels, as will be described below.

The viewing window 14 is seen to comprise a fluid tight cover which is disposed over a viewing portion of the visual indicator 10. Hence, the window 14 is sealingly engaged by the cylindrical wall 16. As shown, the viewing window has a cylindrical surface coaxial with the arcuate surface of the vane 40. A frame member or collar 18 is optionally provided so as to limit the viewing angle which may be perceived through the viewing window 14. Although not necessary, the frame 18 ensures that only one or the other surface section 43 or 45, respectively, of the vane can be perceived when rotated into the viewing plane. Portions of the visual indicator within the compartment 30 which might be distracting to a viewer are effectively blocked from vision by this frame member. In addition, the frame member is useful in mounting the visual indicator on a convenient surface. Of course, if desired, various additional mounting members, such as a mounting ring, may be provided for this purpose.

It is appreciated that suitable intelligible indicia are to be provided on the respective arcuate sections 43 and 45 of the vane 40. This indicia should be indicative of the particular fluidic operating condition which is monitored or which is to be indicated. Thus, words such as on/off, go/no go or start/stop may be provided on the respective surface portions. Alternatively, the respective surface portions may be suitably colored or provided with various types of cross-hatching, arrows, or the like. In a preferred embodiment of this invention, the respective surface portions of the vane are provided with graphic symbols of the type adopted by the American National Standards Institute Inc. which are used to schematically represent the operation of particular fluidic components which are being monitored. Various examples of these graphic symbols are set forth in the table illustrated in FIG. 4. As is appreciated, the graphic symbol shown in line A, Column 1, represents one condition of a fluidic cylinder, whereas the graphic symbol illustrated in line B, Column 1 represents another condition of the fluidic cylinder. It is recognized that these respective graphic symbols can be provided as indicia on the surface portions 43 and 45 of the vane 40 to depict the operating condition of a cylinder being monitored by the visual indicator 10. In the graphic symbols shown in line C, Column 1, there is schematically represented the condition wherein two pairs of ports are opened; that is, fluid does not flow therebetween. In line D, Column 1, the conventional graphic symbol is shown, representing fluid flow between these ports. Those of ordinary skill in the fluid arts will recognize and be familiar with the remaining graphic symbols. In addition, it is intended that this table merely be illustrative and not all-inclusive of the graphic symbols which can be used as indicia on the surface portions 43 and 45 of the vane 40. Also, it is intended that various combinations of these graphic symbols can be used to thus clearly depict as visual indications the particular operating conditions of the fluidic components which are monitored.

The operation of the visual indicator 10 now will be described. Let it be assumed that the visual indicator is mounted such that the respective fluid channels 20 and 22, and thus the pipes 24 and 26, are aligned in the vertical direction so as to be disposed in respective horizontal planes. In this alignment, it is appreciated that the shaft 50 is normal to the direction of gravitational forces. It is further appreciated that the general line-of-sight through the window 14 to the indicia provided on the surface portions 43 and 45 of the vane 40 is substantially horizontal. In this configuration, as shown in FIG. 2, gravitational forces are exerted on the weighted member, such as member 46, of the vane 40 so that the vane assumes the illustrated extreme position whereby the sealing member 44 effectively seals the channel 22 so as to prevent fluid from flowing therethrough. This is the normal, or quiescent, position of the vane 40.

It is appreciated that if the pressure applied to the fluid channel 20 exceeds the pressure applied to the fluid channel 22, a negative differential pressure is supplied to the chamber 30. This, of course, has no effect upon the rotational position of the vane 40. That is, the vane would tend to rotate in the counterclockwise direction in response to this pressure force exerted thereon. However, as has been assumed, the vane is in its normal extreme position and thus cannot rotate further.

Let it now be assumed that the pressure applied to the fluid channel 22 exceeds the pressure applied to the fluid channel 20. If this positive differential pressure exceeds a minimum actuating pressure, to be mentioned below, the pressure force exerted on the vane 40 now tends to rotate this vane in the clockwise direction. As shown, the vane is free to so rotate and rapidly pivots about the shaft 50 so as to urge the sealing member 42 into sealing contact with the discharge portion of the fluid channel 20 and to rotate the surface portion 45 and indicia thereon into the viewing plane. Consequently, the vane 40 has rotated to its other extreme position and assumes the rotational configuration shown in FIG. 3. It is recognized that, in this rotational position, fluid is permitted to flow through the channel 22 into the compartment 30. However, since the sealing member 42 effectively seals the fluid channel 20, fluid is not permitted to flow from the compartment 30 through the fluid channel 20. Since the compartment 30 is fluid tight, fluid does not leak therefrom, and does not leak through the blocked fluid channel 20. Consequently, even in the absence of positive sealing devices, such as O-rings, gaskets, or the like, the visual indicator 10 is actuated to a selective indicating position without accompanying fluid consumption or leakage.

When the aforenoted pressure force is removed from the fluid channel 22, or if the differential pressure across the channels 20 and 22 is reduced below the minimum actuating pressure so as to be, for example, zero, the gravitational forces exerted on the weighted member of the vane 40 causes the vane to rotate in the counterclockwise direction from the extreme position shown in FIG. 3 to the normal, or quiescent position shown in FIG. 2. Thus, it is seen that in this use of the visual indicator 10, gravity reset is exploited to return the visual indicator to a normal condition. Hence, the quiescent indication can be viewed through the window 14 because of this gravity reset.

In an alternative mounting configuration of the visual indicator 10, the gravity reset feature is not exploited. Rather, the visual indicator exhibits a "memory" capability whereby the last indication furnished thereby is retained even in the absence of a differential pressure until an opposite differential pressure is applied. This memory feature is adopted when the visual indicator is mounted such that the effective line-of-sight through the window 14 to the indicia provided on the vane 40 is substantially in the vertical direction. That is, if the mounting frame, or collar, 18 is mounted on a substantially horizontal surface, whereby the visual indicator shown in FIGS. 2 and 3 is rotated by 90° about the shaft 50, the memory feature can be exploited.

In the aforenoted mounting configuration, a positive differential pressure across the fluid channels 20 and 22 will cause the vane 40 to rotate in the counterclockwise direction until the maximum position is reached, whereby the sealing member 44 is in sealing engagement with the discharge portion of the fluid channel 22. When the differential pressure is reduced below the minimum actuating pressure level, or is further reduced to zero, the vane 40 will retain its extreme counterclockwise position. This is because no further forces, either pressure or gravitational, are exerted on the vane sufficient to rotate it. Hence, the immediately preceding visual indication is "stored" in the visual indicator 10.

Now, if a negative differential pressure is applied across the fluid channels 20 and 22, that is, if the pressure applied to the channel 22 exceeds the pressure applied to the channel 20, the pressure force exerted on the vane 40 will rotate the vane in the clockwise direction until the sealing member 42 is in sealing engagement with the fluid channel 20. If this differential pressure is reduced below the minimum actuating pressure level, or is further reduced to zero, the vane 40 nevertheless will retain its extreme clockwise position. This is because no further forces are exerted on the vane when the visual indicator 10 is in this assumed mounting configuration. Therefore, it is seen that this memory feature enables the immediately preceding visual indication of an operating condition to be retained, and thus can be observed through the viewing window 14.

The visual indicator 10 can be mounted in a still further configuration whereby the memory feature is present. In this further mounting configuration, the visual indicator 10, as shown in FIGS. 2 and 3, is rotated by 90° about a horizontal axis perpendicular to the shaft 50. In this mounting configuration, it is appreciated that the fluid channels 20 and 22 are aligned in a horizontal plane and the shaft 50 is parallel to the direction of the gravitational forces. The mounting frame, or collar, 18 is mounted on a substantially vertical plane surface.

As noted hereinabove, the visual indicator 10 in accordance with the present invention effectively minimizes fluid consumption, or leakage, to a negligible amount, in comparison with prior art indicating devices. This avoidance of fluid leakage is attained without the use of sealing devices such as O-rings, gaskets, or the like. As is known, these devices are the source of significant frictional forces which would have to be overcome by applied fluid pressures in order to actuate the visual indicator so as to properly indicate an operating condition. Therefore, by omitting the use of such devices, the vane 40 can be rotated between its extreme positions so as to furnish the corresponding visual indications of operating conditions in response to very low fluid pressures. As an example, when the visual indicator 10 is mounted so that the memory feature is adopted, the vane 40 is rotatable in response to a differential fluid pressure in the range 0.15 to about 0.3 psig. That is, the vane will rotate from one extreme position to its other extreme position in response to the application of a minimum fluid pressure in this range. When the visual indicator 10 is mounted so that the gravity reset feature is adopted, it is appreciated that a somewhat greater fluid pressure is needed to rotate the vane so as to overcome this gravitational force. For the gravity reset mode of operation, the vane 40 will rotate from its normal, or quiescent position to its other extreme position in response to the application of a minimum fluid pressure in the range of 0.25 to about 0.5 psig. Therefore, depending upon the mounting configuration of the visual indicator 10, it is appreciated that the vane is rotatable in response to the application of a minimum actuating pressure which is in the range of 0.15 to 0.50 psig. These low pressures offer improved sensitivity of the visual indicator 10 to sense low-pressure changes in the operating condition of a fluidic system. Nevertheless, the visual indicator is capable of withstanding higher pressures applied thereto, such as in the range of 25 to 100 psig. without suffering any deleterious effects.

In view of the foregoing description, it is appreciated that the angulated walls 32 and 34 of the end block member 12 preferably form an angle of 90° therebetween so as to suitably limit the maximum rotation of the vane 40, whereby the indicia provided on the surface portions 43 and 45 are clearly perceived through the viewing window 14 in accordance with the differential pressure applied to the visual indicator as a function of the monitored fluidic operating conditions. It is convenient to provide indicia on respective quadrants on the arcuate surface of the vane 40 and thus to limit the angular rotation of the vane to a quadrant, i.e., 90°. In this manner, one or the other of the indicium provided on the respective surface portions are viewed.

In the preferred embodiment of the present invention described above, the viewing window 14 was assumed to have a cylindrical surface. It is appreciated that, if desired, the viewing window may have a plane surface, a prismatic surface, or any other type of configuration which may be desired. The purpose of the viewing window merely is to permit the indicia on the vane 40 to be easily viewed, and to complete the fluid tight housing for the compartment 30. Thus, any suitable window can be used to permit the indicia to be perceived as the vane 40 rotates past the viewing plane.

Also, the viewing window 14 may be an integral portion of the cylindrical wall 16, and thus may be formed concurrently therewith, as by conventional molding techniques, or may be a separate member which is sealingly mounted on the cylindrical wall.

It is appreciated that, by using the graphic symbols adopted by the American National Standards Institute Inc. for schematically representing the operation of fluidic components normally used in a fluid operated system, a multiple of these visual indicators 10 can be used to animate the performance of an entire fluidic system. Hence, the operating conditions of this system may be readily analyzed, and trouble-shooting is facilitated. Furthermore, while the conditions of two position valves and actuators are readily represented with a single visual indicator 10, three or more position valves can be represented by using plural indicators as a group.

Furthermore, since conventional sealing devices are not used, it is recognized that, as the vane 40 rotates in response to a differential pressure, there will be some air consumption during the transfer period, that is, during the period that the vane is rotating from one to its other extreme position. However, since the avoidance of these sealing devices results in relatively low frictional forces which oppose the rotation of the vane, and since the vane is constructed of light weight material, it is appreciated that a relatively rapid rotation occurs in response to the application of an actuating pressure. Consequently, the fluid consumption during the transfer period is minimized.

In yet another embodiment of the visual indicator, a protuberance, or pin, 62 is provided on the interior surface of the vane 40 to extend interiorly towards the compartment 30. Although the pin 62 can be juxtaposed to either quadrant defined by the respective surface portions 43 and 45, FIGS. 2 and 3 show the pin to be associated with the portion 43. The pin serves as a suitable support for a spring 64 which extends farther into the compartment 30, and beyond the plane which may be formed to include the sealing members 42 and 44.

It may be appreciated that when the vane 40 rotates in, for example, the clockwise direction in response to a differential pressure which exceeds the minimum actuating pressure, as described above, the spring 64 will contact the wall 32 and will be compressed thereby when the vane rotates to its extreme position. This spring compression exerts an opposite force on the vane 40 so that when the differential pressure is reduced by a sufficient amount, the spring compression force is capable of rotating the vane in the opposite, or counterclockwise direction. Hence, the spring functions to provide the reset feature without requiring the visual indicator to be mounted in predetermined alignment. This adds to the flexibility of applications of the indicator, which may be mounted at virtually any angle to the vertical and horizontal yet still exhibit a reset capability.

It is appreciated that this reset feature is exploited if the spring is provided in association with the portion 45 of the vane 40. Also, suitable support members or devices other than the pin 62 can be used to attach the spring to the vane, as desired. The addition of the spring does not change the operating characteristics of the visual indicator except for the spring-actuated reset feature described above.

While the invention has been particularly shown and described with reference to a preferred embodiment thereof, it will be obvious to those skilled in the art that various other changes and modifications in form and details may be made without departing from the spirit and scope of the invention. It is, therefore, intended that the appended claims be interpreted as including all such changes and modifications.

What is claimed is:

1. A visual indicator for indicating when fluid pressure in one or two fluid channels exceeds fluid pressure in the other fluid channel by a minimum amount in the range 0.15 to 0.50 psig, comprising:

a housing formed of a plurality of members defining a compartment therein and having a substantially fluid-tight cover;

said one and said other fluid channels in said housing terminating at respective first and second outlets discharging into said compartment for applying fluid pressures thereto;

a vane rotatably mounted on a member in said compartment and responsive to the selective application of fluid pressures to said fluid channels for rotation between first and second extreme positions, said vane having spaced apart outlet sealing members at end portions thereof for substantially sealing the first and second outlets in accordance with the extreme rotary positions assumed by said vane to prevent fluid from flowing through a corresponding one of said fluid channels; and indicia bearing means mounted on said vane for selectively disposing said indicia in an indicating position to be viewed through said cover when said vane rotates to a corresponding one of said first and second extreme positions.

2. The visual indicator of claim 1 wherein the surface of said cover is substantially parallel to the axis of rotation of said vane.

3. The visual indicator of claim 2 wherein said vane comprises an exterior surface divided into two substantially equal portions, each surface portion bearing a respective indicium thereon.

4. The visual indicator of claim 3 wherein said indicia comprise graphic symbols schematically representing the operation of fluidic components comprising said fluid operated system.

5. The visual indicator of claim 3 further comprising a spring member attached to said vane and extending therefrom into said compartment to be compressed when said vane rotates to one of said extreme positions so as to exert an oppositely directed force thereon.

6. A visual indicator for a fluid operated system, comprising a housing defining a compartment therein and having a substantially fluid-tight cover; first and second fluid channels in said housing terminating at respective first and second outlets respectively discharging into said compartment for applying fluid pressures thereto; a vane rotatably mounted in said compartment and responsive to the application of fluid pressures to said fluid channels for rotation about an axis of rotation between first and second extreme positions, said axis being substantially parallel to the surface of said fluid-tight cover, and said vane comprising an exterior surface divided into two substantially equal portions, each surface portion bearing a respective indicium thereon, said vane having spaced apart outlet sealing members at end portions thereof for substantially sealing said first or second outlet in accordance with the extreme rotary position assumed by said vane to prevent fluid from flowing through a corresponding one of said fluid channels; and wherein said vane includes a weighted member to normally position said vane in one of said extreme positions in response to gravitational force exerted thereon for viewing of said indicium on one surface portion of said vane through said cover, so that said vane is rotated to the other extreme position in response to the application of fluid pressure to a predetermined one of said fluid channels for viewing of said indicium on the other surface portion of said vane through said cover, and is returned to said one extreme position when said fluid pressure is removed from said predetermined one fluid channel.

7. A differential pressure indicating device, comprising:
   a fluid-tight housing defining a compartment therein and including a pair of ports for receiving differential pressure and a pair of fluid channels in fluid communication between said ports and said compartment;
   a vane disposed in said compartment and rotatably supported by said housing, said vane comprising a frame defining an arcuate surface divided into two substantially equal portions, each portion subtending one-half the angle subtended by said arcuate surface and bearing indicia to be rotated into a viewing plane, said frame having spaced apart sealing members and being responsive to a differential fluid pressure applied to said ports for rotating between a first extreme position whereat one of said sealing members substantially seals one of said fluid channels and a second extreme position whereat the other of said sealing members substantially seals the other of said fluid channels;
   a fluid-tight window provided in said housing and disposed over said viewing plane through which said indicia are viewed, the surface of said window being substantially parallel to the axis of rotation of said vane;
   said frame additionally being provided with a weighted member to normally position said frame in said first extreme position in response to gravitational force exerted thereon, so that said frame is rotated to said second extreme position in response to said differential fluid pressure and is returned to said first extreme position when said differential pressure is removed; and
   means on said vane for indicating when said vane is in one of said extreme positions.

8. A visual indicator for a fluid operated system, comprising:
   a fluid-tight housing comprised of an end member and a viewing window defining a compartment, said end member including a portion projecting into said compartment and having first and second fluid channels therein respectively terminating at first and second outlets discharging into said compartment for applying respective fluid pressures thereto;
   a vane rotatably mounted on said portion in said compartment, said vane having an axis of rotation substantially parallel to the surface of said viewing window, said vane being arc-shaped whose first and second end portions terminate in first and second outlet sealing members, respectively, so that said vane rotates from a first position, whereat said first outlet sealing member substantially seals said first outlet to prevent fluid from flowing through said first fluid channel, to a second position, whereat said second outlet sealing member substantially seals said second outlet to prevent fluid from flowing through said second fluid channel, when the fluid pressure applied through said first fluid channel exceeds the fluid pressure applied through said second fluid channel by a minimum actuating pressure; and
   indicia bearing means mounted on said vane for selectively disposing said indicia in an indicating position to be viewed through said viewing window when said vane is in said first position and when said vane rotates to said second position.

* * * * *